United States Patent
Weller et al.

[11] Patent Number: 5,359,515
[45] Date of Patent: Oct. 25, 1994

[54] VEHICLE OCCUPANT SAFETY SYSTEM AND METHOD FOR OPERATING THE SAME

[75] Inventors: Hugo Weller, Oberriexingen; Peter Taufer, Renningen; Knut Balzer, Ludwigsburg-Pflugfelden; Wilfried Burger, Hemmingen, all of Fed. Rep. of Germany

[73] Assignee: Robert Bosch GmbH, Stuttgart, Fed. Rep. of Germany

[21] Appl. No.: 781,253
[22] PCT Filed: May 16, 1990
[86] PCT No.: PCT/DE90/00364
  § 371 Date: Feb. 28, 1992
  § 102(e) Date: Feb. 28, 1992
[87] PCT Pub. No.: WO91/00200
  PCT Pub. Date: Jan. 10, 1991

[30] Foreign Application Priority Data

Jun. 29, 1989 [DE] Fed. Rep. of Germany ....... 3921250

[51] Int. Cl.⁵ ............................................. B60R 21/02
[52] U.S. Cl. .............................. 364/424.05; 180/271; 280/728 R; 307/10.1
[58] Field of Search .............. 364/424.05; 180/271, 180/274, 281, 282; 280/728, 734, 735, 802; 307/10.1

[56] References Cited

U.S. PATENT DOCUMENTS

| | | | |
|---|---|---|---|
| 4,166,641 | 9/1979 | Okada et al. | 280/735 |
| 4,381,829 | 5/1983 | Montaron | 180/274 |
| 4,614,876 | 9/1986 | Mattes et al. | 307/10.1 |
| 4,836,024 | 6/1989 | Woehrl et al. | 280/735 X |
| 4,845,377 | 7/1989 | Swart | 307/10.1 |
| 4,864,202 | 9/1989 | Nitschke et al. | 307/10.1 X |
| 4,933,570 | 6/1990 | Swart et al. | 307/10.1 |
| 4,953,851 | 9/1990 | Behr et al. | 280/735 |
| 4,980,573 | 12/1990 | White et al. | 307/10.1 |
| 5,083,276 | 1/1992 | Okano et al. | 364/424.05 |
| 5,085,464 | 2/1992 | Behr et al. | 280/735 |
| 5,182,459 | 1/1993 | Okano et al. | 307/10.1 |
| 5,208,484 | 5/1993 | Okano et al. | 307/10.1 |

FOREIGN PATENT DOCUMENTS

| | | |
|---|---|---|
| 0115222 | 8/1984 | European Pat. Off. |
| 0283737 | 9/1988 | European Pat. Off. |
| 0305656 | 3/1989 | European Pat. Off. |
| 2606897 | 5/1988 | France |

*Primary Examiner*—Thomas G. Black
*Assistant Examiner*—Collin W. Park
*Attorney, Agent, or Firm*—Kenyon & Kenyon

[57] ABSTRACT

A vehicle occupant safety system, in particular a restraining system such as an airbag, safety-belt tightener or the like, includes a sensor device having at least two sensors, a preprocessing device comprising at least two preprocessing circuits, for the sensor signals, a computing system and a trigger circuit including at least two stages, for a safety device. For providing a high degree of safety with relatively low costs, the computing system is constructed as a single-computer system in such a way that it processes the data of two preprocessing circuits in two programs with staggered timing with respect to one another.

20 Claims, 2 Drawing Sheets

VEHICLE OCCUPANT SAFETY SYSTEM AND METHOD FOR OPERATING THE SAME

FIELD OF THE INVENTION

The present invention relates to a vehicle occupant safety system, and in particular, a restraining system such as an airbag, safety-belt tightener or the like, with a sensor device having at least two sensors, a preprocessing device comprising at least two preprocessing circuits, for the sensor signals, a computing system and a trigger circuit, including at least two stages, for a safety device.

BACKGROUND OF THE INVENTION

In safety systems such as restraining systems operating on an electronic basis, the critical components, such as sensors, preprocessing circuits, and computers, and in particular, microcomputers for signal processing, may be provided in a redundant fashion, and in particular in duplicate. As a result of the redundancy provided, such known restraining systems provide increased safety. However, this is at the expense of high production costs since a relatively large number of components have to be produced.

If redundancy is omitted in known safety systems, i.e., the system components are simply present once, the costs are indeed lowered, but a lower safety level must then also be assumed. This results from the facts that inappropriate triggerings of the vehicle occupant safety system may not to be ruled out, and that a triggering of the safety system may not occur when it is required.

European No. 0 283 737 describes a circuit arrangement for actuating a protection system for vehicle occupants in which a safety system trigger is disposed in an airbag housing. A plurality of trigger switches are connected in series with one another and in series with the trigger 10, the switches being driven by current sources with are loaded themselves in turn by output signals from logic components. The output signals are fed as a function of the delay of switching double switches to input terminals of the logic components connected in parallel. The functions of the logic components can be taken over by correspondingly programmed microcomputers with corresponding peripherals. In the document, it is also pointed out that for test purposes in each case one part of the trigger switch can be periodically driven at particular intervals, it being also possible for this driving to be carried out by a microprocessor.

SUMMARY OF THE INVENTION

The vehicle occupant safety system according to the present invention provides, approximately the same level of safety as a redundancy system and yet saves considerable costs. The cost savings results from the facts that the computing system used is a single-computer system, that is, not a two-computer or multi-computer system, and that the data supplied by the two preprocessing circuits is processed by the same computer (microcomputer) in two programs having staggered timing with respect to one another, to provide a high level of reliability. This leads to a quasi-redundancy. Provided that the information on the two data signal paths coming from the sensors or preprocessing circuits differs considerably from one another, no triggering of the safety system occurs. The information processing is performed solely by one computer which is connected to a two-stage trigger circuit for the safety device. Differences between the information on the two data signal paths or the occurrence of errors lead to, for example, only a single stage of the trigger circuit being activated so that triggering of the safety system cannot occur since, for this purpose, the activation of both stages is required. By means of the single-computer system according to the present invention, not only are the costs lowered but there remains approximately the same level of safety as in a two-computer system because, for example, a fault in the execution of one of the two programs having staggered timing with respect to the other leads to the other program also not being further executable, so that the safety system is not triggered.

It is provided, in particular, that the respective starts of the two programs are initiated by means of two interrupt sources which are independent from one another. Preferably, so-called timer interrupts are used.

The starting time of the first program is preferably $n \cdot T$ and the starting time of the second program is $(2n+1) \cdot (T/2)$, n being the successive whole positive numbers and T constituting a processing period. As a result, it is ensured that within a processing period both the first and the second program are always started at times which are staggered with respect to one another.

In addition, according to the present invention, a watchdog circuit can be provided which is triggered by the two programs and is connected to a reset input of the computing system. The watchdog circuit must be alternately driven at certain times by both programs so that it does not supply a pulse to the reset input of the computing system, i.e., does not reset the computing system. However, if irregularities or errors occur during the signal processing, which leads to an incorrect triggering or failure of the triggering, a possible incorrect triggering of the vehicle occupant safety system is avoided by means of the resetting of the computing system.

In particular, a window watchdog circuit can be used as the watchdog circuit, i.e., the respective trigger signals must be located within specific time windows for satisfactory functioning.

In order to achieve a particularly high level of safety, the trigger signal is in each case generated in halves by the first and the second program. In particular, it can be provided that the start of the one program, in particular the second program, generates a rising edge, and that the start of the other program, in particular the first program, generates a trailing edge of the trigger signal. Consequently, the aforesaid interrupt sources trigger, in each case at the abovementioned starting times, the execution of the two programs which generate the rising or trailing edge of the trigger signal so that a trigger signal consisting of corresponding square-wave pulses is generated. The signal controls the watchdog circuit for the aforesaid monitoring function.

For a function to proceed correctly, it is necessary that the first program is ended before the second program starts. For safety reasons, it can be provided that the one program tests the termination of the other program. In particular, each program can have an end identifier which is monitored by the other program. In addition, the present invention provides a method for operating a vehicle occupant safety system, and in particular a restraining system, such as an airbag, safety-belt tightener or the like, with a sensor device having at least two sensors, a preprocessing device comprising at least two preprocessing circuits, for the sensor signals, a computing system and a trigger circuit including at least two stages, for a safety device. The computing system may be constructed as a single-computer system processing the data of the two preprocessing circuits in two programs with staggered timing with respect to one another.

A triggering of the trigger circuit occurs only if its two stages are activated based on of an identical or approximately identical result of the execution of both programs.

DETAILED DESCRIPTION

Figure 1:
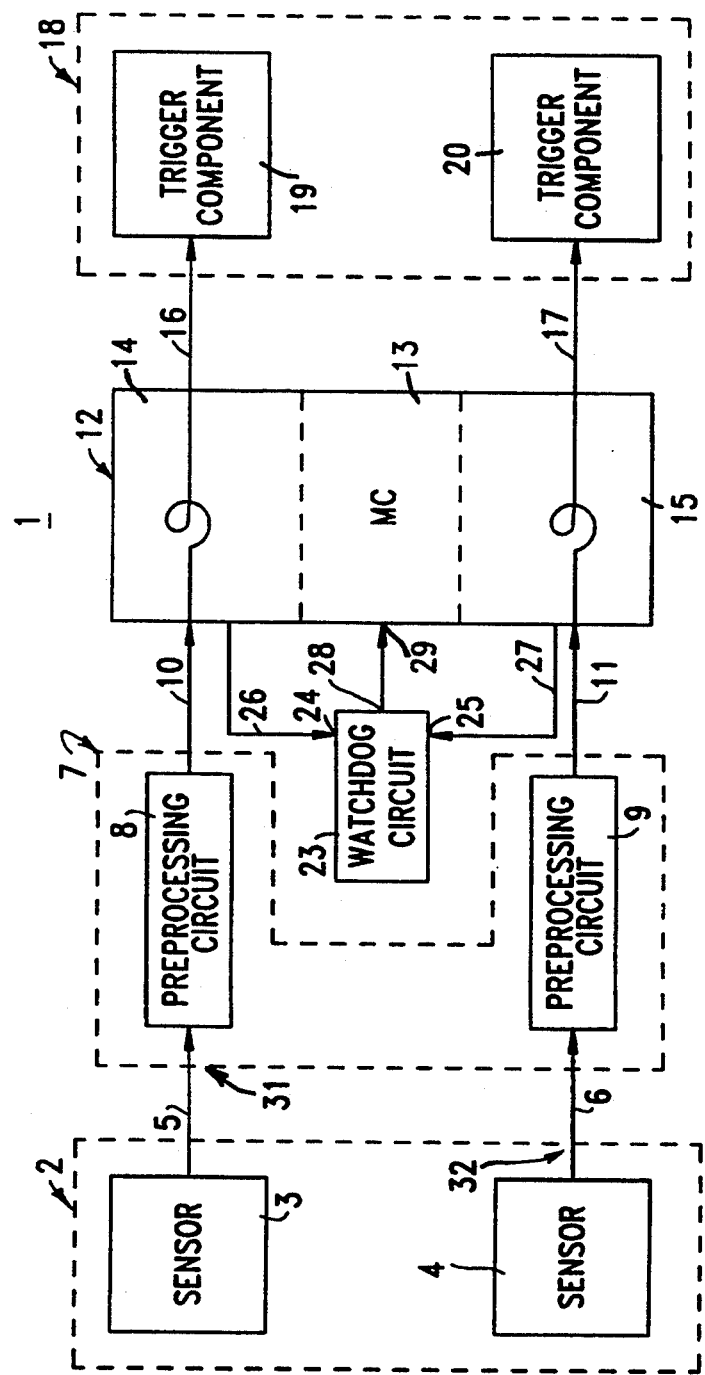
FIG. 1 shows a block diagram of a trigger circuit of a vehicle occupant safety system according to the present invention.

In FIG. 1, component of a vehicle occupant safety system these is shown a, specifically a drive circuit 1. The portion of the vehicle occupant may include a be a restraining system such as an airbag, safety-belt tightener or the like. Safety systems of this kind are triggered electrically, i.e., they have an electrically firable firing cap which, in the case of an airbag, fires a propellant charge which generates the gas pressure to fill up the impact cushion.

According to FIG. 1, the drive circuit 1 has a sensor device 2 which includes two sensors 3 and 4. The sensors 3 and 4 are connected via lines 5 and 6 to a preprocessing device 7 which has a preprocessing circuit 8 and a preprocessing circuit 9. The preprocessing circuit 8 cooperates with the sensor 3 and the preprocessing circuit 9 cooperates with the sensor 4. The preprocessing circuits 8 and 9 are connected to a computing system 12 via lines 10 and 11. The computing system 12 is constructed as a microcomputer 13 in which the signal processing processes 14 (P1) and 15 (P2) proceed with staggered timing. The signal processing process 14 is connected via the line 16 to the trigger circuit 18, which has two components 19 and 20, and the signal processing process 15 is connected via the line 17 to the trigger circuit 18.

In addition, a window watchdog circuit 23 is provided, the inputs 24 and 25 of which are connected to the signal processing processes 14 and 15 via the lines 26 and 27. An output 28 of the window watchdog circuit 23 is connected to a reset input 29 of the microcomputer 13.

The circuit in FIG. 1 operates as follows:

Sensors 3 and 4 monitor the driving state of the vehicle (not shown), e.g., with respect to its acceleration. The accelerations detected by the sensors pass via the lines 5 and 6 to the preprocessing circuits 8 and 9. The preprocessed data is subsequently fed via the lines 10 and 11 to the microprocessor 13, which forms, according to the present invention, a single-computer system 12, that is to say, in contrast to the components 3, 4; 8, 9; 19, 20 the microprocessor 13 is present only once. It processes the information received via the data signal paths 31 and 32 in the two signal processing processes 14 (Pl) and 15 (P2).

According to the present invention, the data originating from the two preprocessing circuits 8 and 9 are processed by means of two programs (first program P1, second program P2) which have staggered timing with respect to one another.

Figure 2:
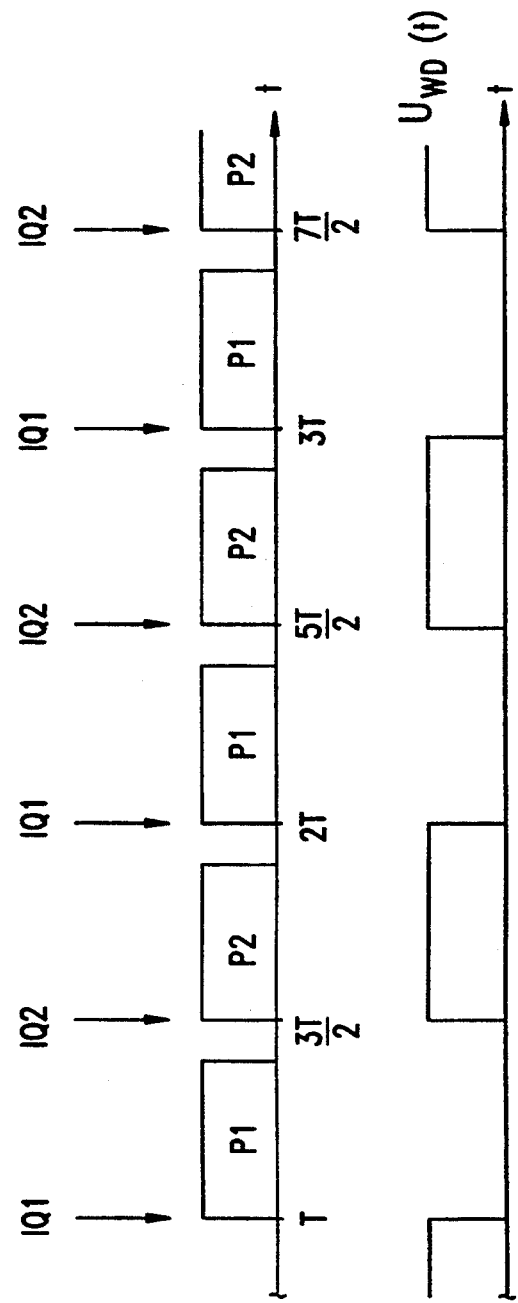
FIG. 2 shows a diagram of the sequence of program execution and the trigger signal of the safety systems of FIG. 1.

This is shown in greater detail in FIG. 2. In the top part of FIG. 2 it can be seen that the two programs P1 and P2 proceed with a staggered timing with respect to one another. Accordingly, the program sequence is: P1, P2, P1, P2, P1 etc. The starting times of the programs P1 and P2 are generated by two interrupt sources IQ1 and IQ2 which are independent from one another. When the timer interrupt IQ1 occurs the program P1 starts and when the timer interrupt IQ2 occurs the program P2 starts.

The starting points of the programs P1 and P2 are determined by the following relations:

The starting time T1 of the first program P1 is $$T1 = n \cdot T$$

and the starting time T2 of the second program P2 is $$T2 = (2n+1) \cdot (T/2),$$

where n is the successive whole positive numbers and T constitutes a processing period.

Within a processing period T, both the program P1 and the program P2 are executed. The respective starting times of the two programs are according to the relations above:

where n=1 : T1=T, T2=3T/2
where n=2 : T1=2T, T2=5T/2
where n=3 : T1=3T, T2=7T/2 etc.

Consequently, the two programs P1 and P2 start alternately with the timing interval T/2. This is tested by the window watchdog circuit 23. In the case of deviations, the window watchdog circuit 23 transmits to its output 28 a reset pulse which is applied to the reset input 29 of the microcomputer 13. This leads to a resetting of the computing system 12 so that incorrect triggerings of the vehicle occupant safety system are avoided.

In particular, the arrangement is constructed in such a way that a trailing edge is transmitted with the start of the signal processing process 14 (P1) and a rising edge is transmitted with the start of the signal processing process 15 (P2), the edges passing via the lines 26 and 27 to the inputs 24 and 25 as trigger signals to the window watchdog circuit 23. If the programs P1 and P2 start alternately with the timing interval T/2, no reset pulse occurs at the output 28 of the window watchdog circuit 23. If irregularities are present in the triggering or a failure occurs, resetting of the microcomputer 13 is performed, as previously described.

The trigger signal $U_{wd}$ (t) generated in the manner described is shown in the bottom part of FIG. 2.

If error-free signal processing occurs in a case of triggering, the two trigger stage components 19 and 20 are driven via the lines 16 and 17. The components have controllable switching elements which are located in series with a firing cap of the vehicle occupant safety system constructed as an airbag, so that a switching through of these switching elements leads to the firing of the firing cap and thus to triggering.

If an improper function occurs or, for example, a program execution is faulty, the reset impulse of the window watchdog circuit 23 prevents triggering of the vehicle occupant safety system. If an error occurs in one of the data signal paths 31 and 32, only one trigger stage component 19 or 20 is activated so that, likewise, triggering of the safety system cannot occur. For safety purpose, it is additionally provided that one program, for example P1, tests the termination of the other program, for example P2, and vice versa. This occurs by virtue of the fact that each program P1, P2 has an end identifier which is monitored by the other program P2, P1. Thus, for example, the program P2 tests whether the program P1 has finished before the time 3T/2 (as shown in FIG. 2).

We claim:

1. A safety system for activating a restraining device of a vehicle, comprising:
   at least two sensors, each sensor generating a respective sensor signal;
   at least two preprocessing circuits, each preprocessing circuit coupled to a respective sensor for receiving the respective sensor signals and for generating respective preprocessing signals based thereon;
   a computing system coupled to the preprocessing circuits for continuously processing the preprocessing signals in respective programs which are executed during respective time intervals which are staggered with respect to one another, and starting at times which are determined based on respective independent interrupts; and
   at least two trigger circuit components coupled to the computing system for activating the restraining device.

2. The safety system as recited in claim 1, wherein the times at which execution of the respective programs start are n·T and (2n+1)·(T/2), respectively, n being positive integers, and T being a processing period.

3. The safety system as recited in claim 1, further comprising a watchdog circuit triggered by a trigger signal generated by the programs, and coupled to a reset input of the computing system.

4. The safety system as recited in claim 3, wherein the watchdog circuit is a window watchdog circuit.

5. The safety system as recited in claim 3, wherein each of the program generates half of the trigger signal.

6. The safety system as recited in claim 3, wherein the time at which execution of one program starts corresponds to the rising edge of the trigger signal, and the time at which execution of the other program starts corresponds to the trailing edge of the trigger signal.

7. The safety system as recited in claim 1, wherein the execution of each program ends before the execution of the other program begins.

8. The safety system as recited in claim 7, wherein each program tests for the end of the other program.

9. The safety system as recited in claim 8, wherein each program has an end identifier which is monitored by the other program.

10. The safety system as recited in claim 1, wherein the restraining device is activated only if the executions of the programs produce approximately identical results.

11. A method for activating a restraining device of a vehicle, comprising the steps of:
    generating a respective sensor signal with each of at least two sensors;
    preprocessing the sensor signals with respective preprocessing circuits coupled to each of the at least two sensors and generating respective preprocessing signals based thereon;
    continuously processing with a computing system the preprocessing signals in respective programs which are executed during respective time intervals which are staggered with respect to one another, and starting at times which are determined based on respective independent interrupts; and
    activating the restraining device using at least two trigger circuit components coupled to the computing system.

12. The method as recited in claim 11, wherein the times at which execution of the respective programs start are n . T and (2n+1)·(T/2), respectively, n being positive integers, and T being a processing period.

13. The method as recited in claim 11, further comprising the steps of:
    triggering a watchdog circuit with a trigger signal generated by the programs; and
    resetting the computing system with the watchdog circuit if the programs fail to properly trigger the watchdog circuit.

14. The method as recited in claim 13, wherein the watchdog circuit is a window watchdog circuit.

15. The method as recited in claim 13, wherein each of the programs generates half of the trigger signal.

16. The method as recited in claim 13, wherein the time at which execution of one program starts corresponds to the rising edge of the trigger signal, and the time at which execution of the other program starts corresponds to the trailing edge of the trigger signal.

17. The method as recited in claim 11, wherein the execution of each program ends before the execution of the other program begins.

18. The method as recited in claim 17, wherein each program tests for the end of the other program.

19. The method as recited in claim 18, wherein each program has an end identifier which is monitored by the other program.

20. The method as recited in claim 11, wherein the activating step is performed only if the executions of the programs produce approximately identical results.

* * * * *

UNITED STATES PATENT AND TRADEMARK OFFICE
CERTIFICATE OF CORRECTION

PATENT NO. : 5,359,515

DATED : Oct. 25, 1994

INVENTOR(S) : WELLER et al

It is certified that error appears in the above-identified patent and that said Letters Patent is hereby corrected as shown below:

Column 1, line 18, after "circuits" delete ",";

Column 1, line 43, "functions" should be --function--;

Column 2, line 19, "n" should be -- n.T--

Column 2, line 20, delete "T";

Column 3, line 22, after "Figure 1" insert
    --there is shown a--;

Column 3, line 23, delete "these is shown a"; and

Column 5, line 45, "program" should be --programs--.

Signed and Sealed this

Sixth Day of June, 1995

*Attest:*

BRUCE LEHMAN

*Attesting Officer*     *Commissioner of Patents and Trademarks*